Oct. 16, 1956

C. A. TAYLOR 2,767,076

METHOD FOR REDUCTION OF IRON ORES

Filed June 1, 1955

Oct. 16, 1956 C. A. TAYLOR 2,767,076
METHOD FOR REDUCTION OF IRON ORES
Filed June 1, 1955 3 Sheets-Sheet 3

INVENTOR.
CHARLTON A. TAYLOR.
BY
*Christy, Parmelee & Strickland.*
ATTORNEYS.

2,767,076

METHOD FOR REDUCTION OF IRON ORES

Charlton A. Taylor, Garrettsville, Ohio

Application June 1, 1955, Serial No. 512,455

10 Claims. (Cl. 75—34)

This invention is directed to a low temperature method of direct reduction of metals from their ores while retaining the metals below their fusion temperatures and preventing their chemically uniting with other materials present in the ore.

The principal object of the nivention is to provide an improved process for recovering metals from their reducible compounds by gases rich in free hydrogen.

Another object of the invention is to provide an improved continuous process for recovering metals from finely divided ores containing oxides of the metals by reduction with free hydrogen gas while passing the finely divided ores vertically through a reaction zone at controlled temperatures and maintaining an excess of hydrogen over that required for the weight of oxide being processed.

Another object of the invention is to provide an improved form of apparatus for processing the ore and preventing re-oxidation of the reduced metals.

A further object of the invention is to provide apparatus for de-oxidizing the ore without sintering so as to retain the metal in substantially particle size as it moves out of the reaction zone.

These and other objects will be made apparent from the following description and accompanying drawings in which Fig. 1 is a schematic arrangement of apparatus for practicing the invention;

Figure 1:
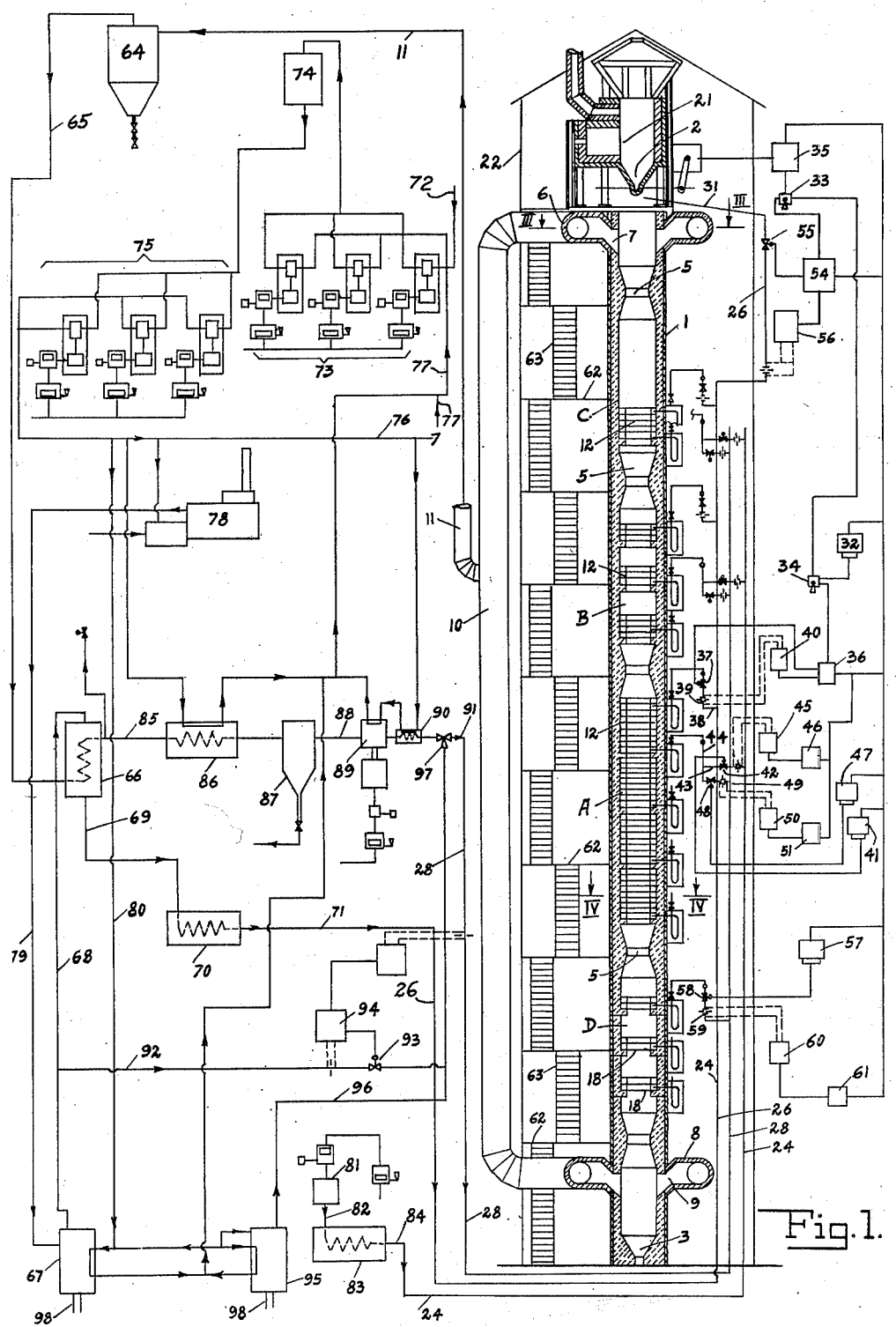

In the practice of the present invention gases rich in free hydrogen, in stoichiometrical excess of that required to reduce the ore being processed, flow upwardly through a reaction zone in contact with ore falling downwardly through the zone. The temperature within the reaction zone is maintained below the sintering point of the metal being reduced and is preferably highest in the lower portion of the zone. The pressure within the reaction zone is preferably substantially atmospheric and the velocity of the gases flowing through the zone is influenced by the amount of ore within the reduction zone. Because of these conditions, the quantity of ore processed per unit of time may be varied while maintaining a uniform degree of reduction of the ore.

The temperatures within the reaction zone are established and maintained by combustion of hydrogen therein. The major portion of the hydrogen is preferably supplied to the lower portion of the reaction zone at intervals along its length as is also oxygen or combustion air to provide the necessary temperature which is then maintained by selective feeding of combustion air or a cooling gas such as hydrogen or nitrogen. The intermediate portion of the reaction zone is provided with a lesser number of gas inlets for hydrogen, combustion air and cooling gas. The upper portion of the zone may also be provided with a few of such gas inlets at least adjacent its lower end for temperature control. Slight restrictions between said zone portions serve to define the portions of varying temperature and assist in controlling ore flow, by deflection away from the sides of the zone. Beneath the reaction zone is a zone through which the metallized particles of the ore pass and are enveloped by a cooling gas for reducing the temperature of the particles. An outlet at the top of the reaction zone or beneath the cooling zone for withdrawal of the gases provides circulation through the zones.

The rate at which the hydrogen gas is supplied to the reaction zone, after reaction temperatures are established, is proportional to the quantities of ore within the reaction zone. A stoichiometrical excess of hydrogen to substantially completely reduce the metallic oxide content per pound of ore, within the zone, is continuously supplied to the reaction zone. Natural expansion of the gases being introduced into the reaction zone maintains a continuous and somewhat turbulent upward flow of the gas so as to envelope each falling ore particle providing a substantially uniform rate of reduction of the metallic oxide therein. Preferably the gases are preheated prior to introduction into the reaction zone to prevent undue reduction of the temperature within the zone. By reason of the gas expansion the gravitational feed of ore particles through the zone is not interfered with. When additional heating of the zone is required, additional quantities of hydrogen and combustion gas are supplied. When the temperature rises above established limits, cooling gas is supplied in the areas needed.

In the case of reduction of iron ores, the principal ores used are hematite and magnetite ores containing the oxides $Fe_2O_3$ and $Fe_3O_4$ respectively. The chemistry of the reaction of these oxides is quite simple and well known. It is this simplicity which has continuously urged the industry to adopt the direct reduction of the ores with hydrogen since the hydrogen reacts directly with the oxygen of the oxide to produce Fe and $H_2O$. In the case of hematite ore the reaction is $$Fe_2O_3 + 6H \rightarrow 3H_2O + 2Fe$$

in the case of magnetite ores the reaction is $$Fe_3O_4 + 8H \rightarrow 4H_2O + 3Fe$$

Preheating of the ores to temperatures above 400° F. drives off the adsorbed moisture and much of the water of crystallization thereby reducing the volume of water vapor in the reaction zone. It is for this reason that it is preferred to use dry ores. The reactions above given are sometimes reversible at high temperatures and for this reason the temperatures in the lower end of the reaction zone are the higher in order to drive off from the metallified particles such water vapor as may be present to prevent re-oxidation of the particles. This re-oxidation of metallified particles is well illustrated in $$Fe + steam \rightleftharpoons Fe_3O_4 + H.$$

The particle size to which the ore is reduced tends to impose a restriction on the capacity of the reaction zone in that a balance must be maintained between the falling velocity of the ore particle and the upward velocity of the gases flowing through the reaction zone. The invention will utilize ore particle sizes between 100 to 500 mesh. The length of the reaction zone should be such as to accommodate the falling velocities of the larger particles. The ore particles entering the top of the zone are raised to reaction temperature during passage through the upper area thereof so that the major portion of the reduction thereof takes place in the higher temperature areas of the lower portions of the reaction zone. By reason of the hydrogen inlets being located at a plurality of points along the length of the reaction zone, this gas could be injected under pressure across the zone to selectively retard upward gas velocity or falling velocity of the particles. The upward gas velocity serves a useful purpose in removing gangue material in the ore before it passes through the reaction zone.

Increased production from a given apparatus can be obtained by preheating the ore particles before feeding to the top of the production zone. Such procedure reduces the amount of water vapor within the reduction zone and correspondingly reduces the velocity of gas flow through the zone. Preheated hydrogen may also be mixed with the ore in the feeding mechanism to accelerate the starting of the reaction. These conditions tend to reduce the necessary dwell time of ore in the reaction zone permitting increased rate of feed of ore to the zone. Withdrawal of such portions of the gases as are necessary from below the cooling zone, thus reducing upward gas velocities in the reduction zone, permits increased rate of feed of fines to the zone and reduces losses through blow-out of fines at the top of the reaction zone.

Figure 2:
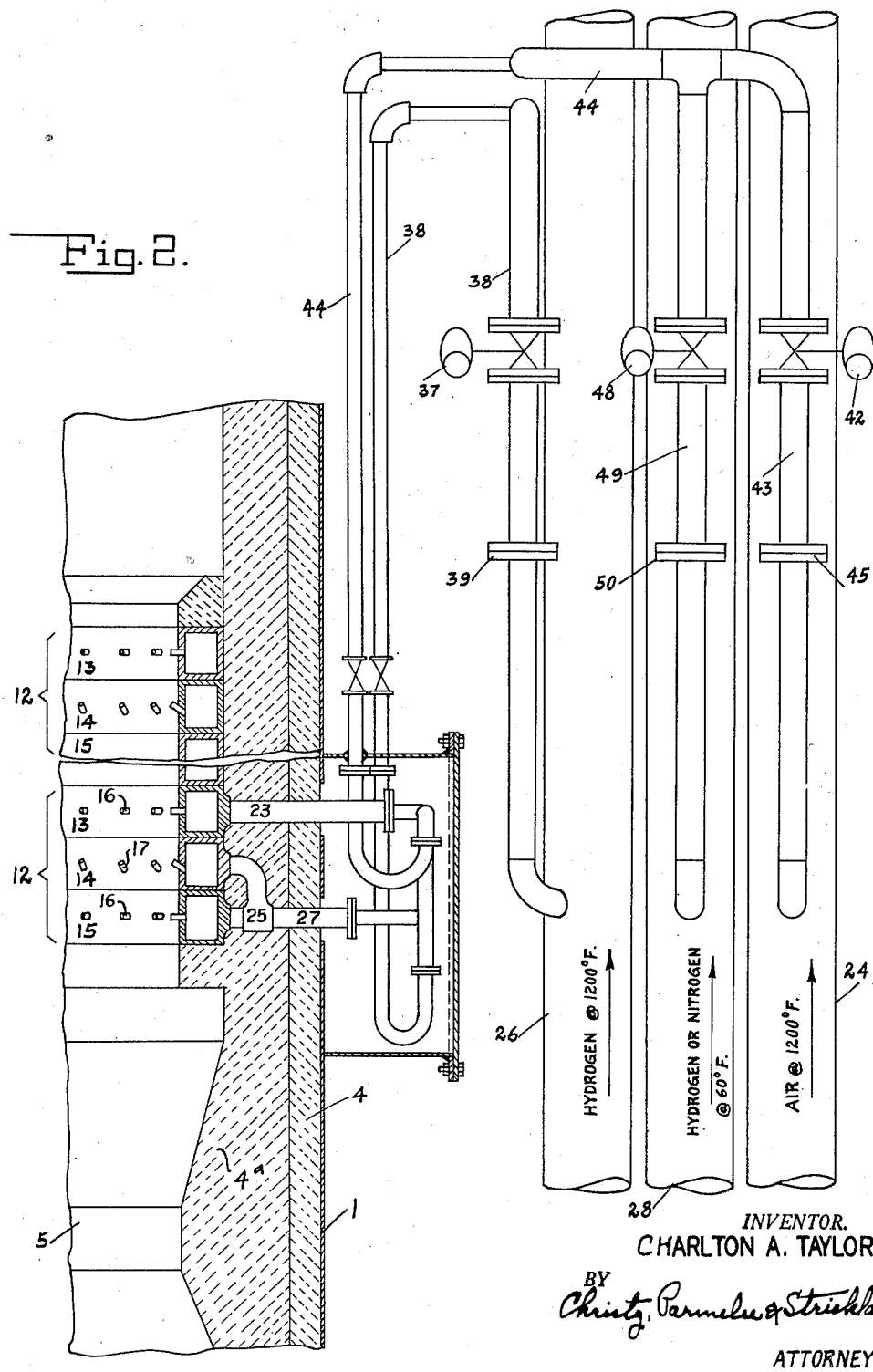
Fig. 2 shows an enlarged typical section through a portion of the apparatus illustrating the burner rings and gas feed lines.
Figure 3:
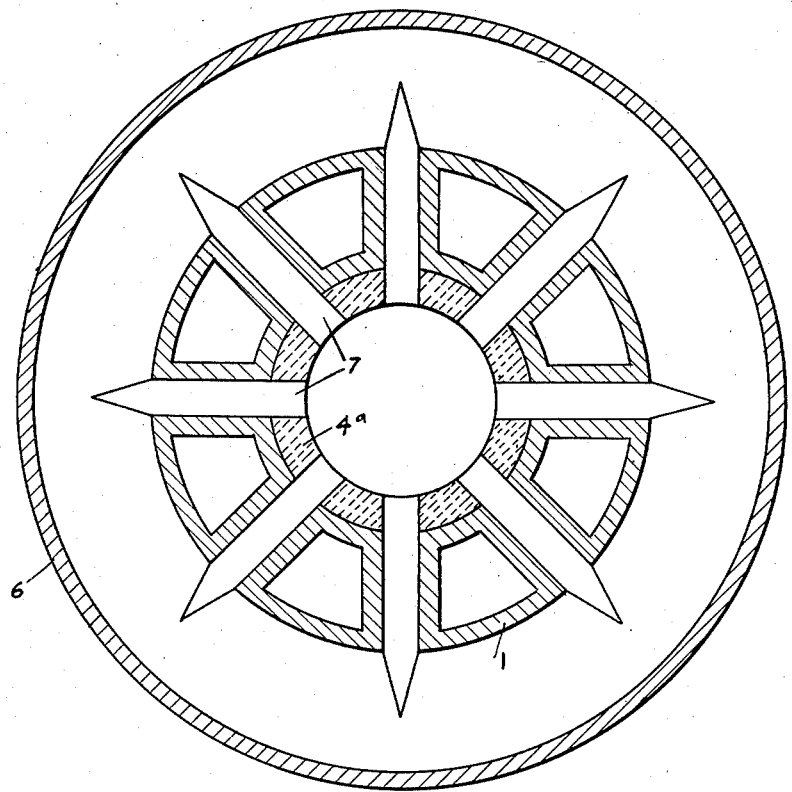
Fig. 3 shows an enlarged typical section through the apparatus showing the gas ports and chamber for removal of waste gases adjacent the top and bottom of the apparatus.
Figure 4:
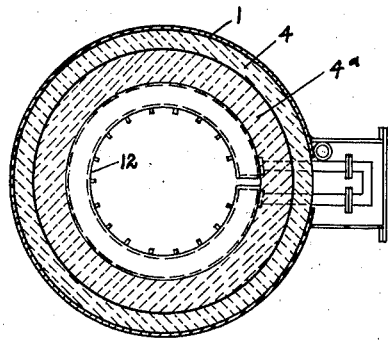
Fig. 4 shows an enlarged typical cross section through the furnace at the burner rings.

Referring now in detail to the drawings, the reaction zone comprises the vertical metal shaft 1 having at the upper end thereof an ore feeding mechanism 2 and at the lower end a suitable chamber 3 for collecting the reduced metal. The shaft 1 is preferably circular in cross section and is provided with an insulating lining 4 faced with suitable refractory material 4a to withstand the temperatures within the shaft. The lining 4a is restricted at a plurality of points throughout the length of the shaft as at 5. At the top of shaft 1 is a circular chamber 6 connecting with the interior of the shaft by means of a plurality of waste gas ports 7 spaced about the circumference of the shaft. A similar circular chamber 8 having waste gas ports 9 connecting with the interior of the shaft is located adjacent the bottom thereof. A stack 10 having an outlet 11 connects the chambers 6 and 8 for withdrawing waste gases from the shaft through the ports 7 and 9. Within the reduction zone of shaft 1 are a plurality of burners each indicated generally by the reference character 12. Each burner is comprised of three hollow circular rings 13, 14 and 15. Each of the rings have a plurality of nozzles about the inner periphery thereof for feeding gases into the interior of the shaft 1. The nozzles 16 in rings 13 and 15 preferably being disposed horizontally and the nozzles 17 in ring 14 being preferably inclined upwardly. Each ring has an inlet opening in the outer wall thereof for introduction of the gases to the nozzles. The burners or groups thereof are held in position by the lining 4a as shown in Fig. 2. Adjacent the lower portion of the shaft 1 beneath the reduction zone, the burners are preferably single rings 18 having horizontally disposed nozzles 19 and gas inlet 20. These rings may be used in groups of two or more, if desired.

The ore feeding device indicated generally at 2 may be of any suitable design and preferably includes a screw conveyor which at one end receives the ore and at the other end discharges it onto a suitable device for feeding the ore uniformly over the interior of the top of shaft 1. The ore before being admitted to the feeding device is suitably crushed and screened so as to feed a substantially uniform particle size of ore to the feeder. Preferably the ore, after being crushed and screened, is preheated before being supplied to the feeder. The preheater, located adjacent the top of shaft 1, may be of any suitable design and is illustrated conventionally as at 21. The chamber 3, located at the bottom of shaft 1, may be of any suitable design. Its purpose is to collect the metallized ore particles and retain them against re-oxidizing before further processing. The stack, preheater and ore feeder are preferably housed in an enclosure 22.

The restrictions 5 of shaft 1 serve to define temperature areas within the reduction zone, of which the highest temperature is maintained in area A and the areas B and C respectively are of decreasing temperatures. The establishing and maintaining of the temperatures within areas A, B and C is accomplished through the burners 12. Burner ring 13 providing combustion air or cooling gas and rings 14 and 15 supply hydrogen. Ring 13 has an inlet 23 connecting with the combustion air supply line 24 and cooling gas supply line 28. Ring 14 has an inlet 25 connecting with the hydrogen supply line 26. Ring 15 has an inlet 27 connecting the inlet 25. The inlet connections 23, 25 and 27 may be spaced about the circumference of shaft 1. For purposes of illustration only inlets 23 and 25 are shown applied to Fig. 1, but it will be understood that each burner 12 has an inlet 23 connecting with the combustion air and cooling gas supply lines and inlets 25 and 27 to the hydrogen supply line, as shown in the typical section of Fig. 2. The hydrogen supply line 26 extends above shaft 1 and has an inlet 31 to the screw conveyor of feeder 2. Control mechanism for feed of ore and gases to shaft 1 are schematically shown to the right thereof in Fig. 1. For clarity in illustration the control mechanism for gas feed is shown for only one group of burners 12 in temperature area A and it is to be understood that each group of burners 12 are connected with the control mechanism shown, unless otherwise indicated on Fig. 1. The control mechanism may be mounted on a suitable panel or panels (not shown) at one side of the shaft 1.

The reaction zone is comprised of the temperature areas A, B and C, defined by the restrictions 5, and the temperatures within the respective areas are preferably relatively closely controlled to obtain best and uniform results. Fig. 1 shows a schematic arrangement of a system of controls of both temperature and volume of hydrogen supplied for the reduction process.

The hydrogen, cooling gas and combustion air supply lines 26, 28 and 24 respectively, extend upwardly along the side of the shaft 1 for substantially the height of the reduction zone. The hydrogen supply line 26 extends above the shaft 1 to adjacent the ore feeder 2 and has a connection 31 with the screw conveyor therein. A suggested form of electrically operated continuous control system is shown in detail in connection with the burners in temperature areas A and D only. It is to be understood that the controls for area A may be duplicated for areas B and C.

The electrically actuated controls for the burners 12, as shown in area A of the reduction zone include a temperature controller 32 connected in circuit by selector switches 33 and 34 with an ore weight recorder and transmitter 35. These selector switches may be suitably actuated so as to control flow of hydrogen from line 26 to the burners in accordance with the weight of ore fed to the shaft 1 or by the temperature of the area within which the burner is located. In either case a hydrogen flow recorder and controller 36 is connected with selector switch 34 and electrically operated valve 37 to feed hydrogen gas from line 26 to burners 12 through line 38 and the orifice 39 controlled by the hydrogen flow transmitter 40. A controller 41, connected with shaft thermocouples recording temperatures in the area of the burners 12, automatically opens valve 42 to admit combustion air from line 24 to burners 12 through lines 43 and 44 when the temperature falls below a set point and to close valve 42 when the temperature returns to the preselected point. A combustion air flow transmitter 45 and flow recorder 46 register the amount of air admitted to the burners 12. A controller 47, connected with shaft thermocouples recording temperatures within the area of the burners 12, actuates valve 48 to admit cooling gas through lines 49 and 44 to burners 12 when the temperature rises above a set point and to close valve 48 when the temperature falls below a selected point. A cooling gas transmitter 50 and recorder 51 register the amount of cooling gas admitted to burners 12. Line 44 forms a common connection between lines 43 and 48 with burner 12 but transmits only one gas at a time since valves 42 and 48 are never open at the same time. When hydrogen is fed to the ore within the screw conveyor of feeder 2, a hydrogen flow recorder and controller 54 connected with the ore weight recorder 35 through selector switch 33 actuates valve 55 in supply line 26 to feed hydrogen to the screw conveyor through line 31. The flow of hydrogen through valve 55 being recorded in controller 54 through transmitter 56.

The burners 18 located in cooling zone D are preferably single rings and may be mounted in any desired groupings of one or more. The burner ring 18 supplies only cooling gas to zone D and in all respects may be of same construction as burner rings 13. Each burner ring 18 or group of rings 18 are controlled by a cooling zone temperature recorder control 57 of any suitable design connected with shaft thermocouples in zone D acting to open valve 58 in line 59 leading from supply line 28 to admit cooling gas to zone D when the zone temperature rises above the selected temperature and to close valve 58 when the temperature is lowered to a preselected point. Cooling gas flow transmitter 60 and gas flow recorder 61 of suitable design record the amount of cooling gas used.

To the left of the shaft 1, as shown in Fig. 1 of the drawing, is shown an arrangement of mechanisms for generation and recycling of the several gases in supply lines 24, 26 and 28. There is also shown means for supplying cooling waters for the conveyors and the gas generators. The conveyors, as such, are not shown in the drawings as they may be purchased commercially and are used to convey ore to the ore crushers (not shown) and to convey crushed ore to the feeder 2 and preheater 21. Within the enclosure 22 and about stack 1 are platforms 62 and steps 63 for servicing the various valves of the control system previously described.

Waste heat gases withdrawn from the shaft 1 through the stack 11 may be passed through a cyclone separator 64 to remove solids and then passed through line 65 to a heat exchanger 66 where they may be used to heat newly generated hydrogen from a generator 67 having an outlet line 68 leading to the heat exchanger 66. The newly generated hydrogen passing from the heat exchanger through line 69 into the natural gas fired preheater 70 and from there through line 71 to the gas supply line 26. Cooling water from city water supply 72 may be led through a series of cooling water transfer pumps 73 and pumped into a cooling tower 74 from whence the water may be passed to cooling water circulating pumps indicated generally by the reference character 75. Such cooling water may then be passed through a line 76 to the conveyors and cooling water from the conveyors may be received in a line 76 connected with a return line 77 to the cooling water transfer pumps. A natural gas fired steam generator 78 may be provided to supply steam through lines 79 to the hydrogen generating plant 67 and cooling water for the hydrogen generating plant may be supplied through a line 80 from the cooling water circulating pumps. An air blower fan 81 may be provided to supply combustion air which may be passed through line 82 into a natural gas fired preheater 83 and from thence out through line 84 to the combustion air supply line 24. In such cases where hydrogen is used as the cooling gas the recycled hydrogen from the heat exchanger may pass out through line 85 to a recycled hydrogen cooler 86 and from there into a water separator 87 to remove the water vapor. The recycled hydrogen may then be passed through line 88 into a hydrogen compressor indicated generally by reference character 89 and from there into an after-cooler 90 where it may be reduced to temperature of about 60° F. The cooled gas may then be led through line 91 and suitable valves into the cooling gas supply line 28. The recycled waste hydrogen gas is usually insufficient to provide the desired volume of cooling gas in which event a branch outlet 92 may be taken from the hydrogen generating plant 68 and conducted through valve 93 connected with a make-up hydrogen recorder and controller 94 from which make-up hydrogen may then be fed into the cooling gas supply line 28. In those cases where nitrogen is used as the cooling gas the recycled hydrogen will also contain considerable nitrogen which may be again conducted through the line 91 to the cooling gas supply line 28 and additional nitrogen supplied from a nitrogen generating plant 95 connected by suitable line 96 to valve 97 and thence through line 91 to the cooling gas supply line 28. Both the hydrogen generating plant and the nitrogen generating plant may be supplied with suitable gas and electricity by the supply lines indicated generally by the reference character 98.

The conditions under which the herein described apparatus may be operated to effect reduction of metal oxides in the ores used are subject to a number of variables some of which are, the metals being reduced, the oxide content of the ore, particle size of ore, the temperature within the reaction zone, the time required to pass ore through the apparatus, preheating of the ore, upward velocity of the gases flowing through the apparatus, and the rate of feed of ore to the apparatus. The maximum temperatures within the reaction zone are preferably maintained below the sintering point of the metal and can be as low as 850 to 1000° C. The smaller the particle size and the slower the descent thereof through the reaction zone the lower the temperature.

In the practice of the invention when using iron ore, the zones A, B and C of stack 1 are heated through combustion of hydrogen and air in burners 12 to establish temperatures of 850 to 1000° C., 350 to 500° C. and 250 to 350° C. respectively therein. These gases are preferably heated to about 650° C. before being fed to burners 12. When the zones have reached the required temperatures, selector switches 33 and 34 may be set to feed hydrogen to burners 12, in stoichiometrical excess, through hydrogen flow recorder and controller 36 in accordance with the weight of ore being fed to the stack as registered by ore weight recorder and transmitter 35. The ore in particle sizes of 100 to 500 mesh is distributed evenly over the area of the top of stack 1 into zone C. The rate of ore feed to zone C is regulated to produce the desired production of metal up to the capacity of the shaft 1. The respective temperatures in zones A, B, C are now under control of controllers 47 and 41 which respectively feed cooling gas or combustion air to burners 12 in maintaining the proper temperatures within such zones.

As the ore particles begin their descent through zones A, B and C they are met by the upwardly flowing gases which mix with the particles and impart some turbulent action thereto. As the particles pass the first shaft restriction 5, they are deflected into the center of zone C and become heated. The smaller oxide fines in the ore may be reduced here and the gangue blown out of the shaft through waste gas ports 7 into member 6. The larger particles, reduced ore fines and remaining ore fines pass through the next restriction 5 into zone B where their temperatures are further raised and reduction continues. Passing out of zone B and through restriction 5 the particles enter zone A where reduction is completed. The metallized particles now pass through zone D where they are cooled and pass into the storage receptacle 3.

Dry iron oxides in the presence of stoichiometrical excess of hydrogen tend to form metal particles of about the same size and shape as the original particles when reduced at temperatures of about 1650° F. The metal is known as sponge iron. In the present process, due to the small size of the particles, the reduction is completed before the particles leave area A of the reduction zone. Due to the low temperature within the reaction zone and the short dwell time of the particle within the zone the particles do not become sufficiently heated to become tacky. Therefore upon cooling in zone D, where gas such as hydrogen or nitrogen at about 60° F. is admitted, the particles tend to retain their separate forms. The product thus obtained is essentially sponge iron particles mixed with some gangue and other metals which may have been present in the ore. Due to the temperatures of operation, many impurities in the ore tend to gasify and pass off with the waste gases. The low temperature of the metallized particles and their short dwell time in the shaft inhibits their contamination by the gasified impurities.

The ore particles may advantageously be preheated to about 600° C. or higher before being fed into shaft 1 thereby reducing water vapor within the shaft and accelerating the ore reaching reduction temperature. In the case of the larger ore particles this insures complete reduction before passing into zone D and in the case of the smaller particles tends to increase the capacity of the apparatus since the ore particles are less dense than the metal particles. Further advantages may be had by injecting preheated hydrogen into the pulverized ore fed to the screw conveyor to the ore feeder. If the temperatures are high enough, reduction can begin in the feeder before the ore enters the shaft 1. In some cases where the pulverized ore may tend to fall through the shaft before being sufficiently reduced to metal, it will be possible to increase the dwell period of the particles within the shaft by admitting hydrogen under sufficient pressure at selected points along the shaft 1 to restrain the falling particles. In such cases best results are obtained by utilizing burner rings 15 for this purpose as their nozzles provide a flat area of pressure.

The apparatus as shown provides great flexibility in practicing the method herein described. Dampers may be mounted in stack 10 to control the gas pressure within shaft 1. When a considerable volume of fines are being passed downwardly within stack 1, the dampers may be regulated to reduce blow-out of the fines. Regardless of the mesh size of ore being fed to the reaction zone, the feeder is arranged to always spread the ore uniformly over the top of the shaft permitting free access of the hydrogen gas thereto. If large volumes of fines are being fed to the reaction zone and the dampers when set to reduce undesirable blow-out of the ore create undesirably high pressures within the zone, all or part of the waste gases may be withdrawn through the bottom of stack 1. It is possible therefore by regulation of the dampers and/or control of the direction of flow of gases through the stack to obtain most any desired pressure or dwell time of particles within the stack.

When initially heating the reaction zones A, B and C to reduction temperatures, care must be taken to avoid an explosive mixture of air and hydrogen. It is recommended therefore that a mixture of about 75% hydrogen and 25% nitrogen be used and the air supplied at a rate of 5 to 10% of the hydrogen content of the mixture. After the apparatus is heated to operating temperatures sufficient nitrogen will be in the reaction zone from area D to permit use of un-mixed hydrogen for reduction purposes and for maintaining the required reduction temperatures in areas A, B and C of the reduction zone. It is recommended that hydrogen for reduction purposes be fed uniformly to only areas A and B as sufficient hydrogen will be supplied from these areas to area C.

This application is a continuation-in-part of my copending application Serial No. 360,395 filed June 8, 1953.

The apparatus as disclosed herein, insofar as the details of construction are concerned, is primarily for purposes of illustration and not limitation except as made necessary by the scope of the appended claims.

I claim:

1. A continuous method of direct reduction of metal oxides by reaction with hydrogen comprising the steps of, establishing a vertically disposed unobstructed reaction zone having a temperature gradient from top to bottom of the zone from about the temperature of reaction to a maximum temperature below the sintering temperature of the metal oxide being reduced, maintaining the established temperature gradient within the zone by selective feeding of hydrogen and combustion air and of a cooling gas at vertically spaced intervals along said zone, uniformly feeding a uniformly crushed metallic ore of 100 to 500 mesh to the top of the zone for free gravitational movement through the zone and in such volumes to permit the ore particles to be maintained in spaced relation by upwardly flowing gases within the zone, continuously contacting the free falling ore particles within the zone with at least a stoichiometric amount of free hydrogen gas introduced into the zone proportional to the rate of feed of ore particles to the top of the zone for direct reduction of the metallic oxide content of the ore to a metallic state while moving through said zone, removing the waste gases from the zone, chilling the metallized particles in a non-oxidizing atmosphere as they issue from said reaction zone, then collecting the metal particles for further processing.

2. The method as defined in claim 1 wherein the ore being reduced is iron ore and the temperature gradient from the top to the bottom of the reaction zone is from about 250° C. to about 850° C.

3. The method as in claim 2 wherein the ore particles are pre-heated to a temperature removing all water therefrom before being fed to the top of the reaction zone.

4. The method as in claim 3 wherein the ore particles are mixed with free hydrogen before being fed to the top of the reaction zone.

5. The method as in claim 1 wherein at least some of the waste gases from the reaction zone are withdrawn from adjacent the bottom of said zone at a controlled rate for regulation of gase velocity within the said zone.

6. The method of claim 1 wherein the removal of gases from the top of the zone is regulated to retain the ore particles within the zone until fully reduced.

7. The process as in claim 1 wherein the lowermost portion of the reduction zone is maintained at a temperature between 850 to 1000° C. and the zone portion immediately above is maintained at temperatures between 300 to 600° C.

8. The process as in claim 1 wherein the combustion air and hydrogen fed to the reaction zone is above the temperature of reaction.

9. A method of recovering metals from finely divided iron ores which are reducible to metal by hydrogen, comprising establishing an unobstructed vertical reduction zone, flowing a heated hydrogen atmosphere through the zone, maintaining a plurality of vertically spaced temperature areas within the reduction zone with the temperature of the lower area at 1800 to 2000° F. and the temperature of the top area not less than 450° F., crushing the ore to a uniform particle size passing a 100 to 500 mesh screen, uniformly feeding the ore to the top of the reaction zone for freely falling gravity feed therethrough, feeding hydrogen gas to at least one of the temperature areas of the reaction zone to maintain an excess of hydrogen over that required to complete the reaction with the ore passing through the zone, selectively feeding combustion air or a cooling gas to the temperature areas of the zone to maintain the selected temperatures withdrawing the waste gases with suspended ore and gangue from at least the upper end of the reaction zone, then collecting and storing the metallized particles issuing from the reaction zone in a non-oxidizing atmosphere for further processing.

10. The method as in claim 9 wherein the pressure of excess hydrogen fed to the reaction zone is proportional to the weight of ore particles passing through the zone so as to retain the ore therein until reduced to metallic form.

(References on following page)

References Cited in the file of this patent

UNITED STATES PATENTS

| | | |
|---|---|---|
| 1,269,054 | Clark et al. | June 11, 1918 |
| 1,289,835 | Longyear et al. | Dec. 31, 1918 |
| 1,370,915 | Riveroll | Mar. 8, 1921 |
| 1,747,716 | Howell | Feb. 18, 1930 |
| 1,935,951 | Payne et al. | Nov. 21, 1933 |
| 1,989,072 | Billinghurst | Jan. 29, 1935 |
| 2,166,207 | Clark | July 18, 1939 |
| 2,231,760 | Foerster et al. | Feb. 11, 1941 |
| 2,609,288 | Stuart | Sept. 2, 1952 |
| 2,654,589 | Somogyi | Oct. 6, 1953 |

OTHER REFERENCES

Ramseyer: Sponge Iron—Its Possibilities and Limitations, "Iron and Steel Engineer," July 1944, pages 38–39.